(12) United States Patent
Bohn et al.

(10) Patent No.: US 8,873,149 B2
(45) Date of Patent: Oct. 28, 2014

(54) PROJECTION OPTICAL SYSTEM FOR COUPLING IMAGE LIGHT TO A NEAR-EYE DISPLAY

(71) Applicants: David D. Bohn, Fort Collins, CO (US); Ned Nestorovic, Seattle, WA (US); Steve J. Robbins, Bellevue, WA (US)

(72) Inventors: David D. Bohn, Fort Collins, CO (US); Ned Nestorovic, Seattle, WA (US); Steve J. Robbins, Bellevue, WA (US)

( * ) Notice: Subject to any disclaimer, the term of this patent is extended or adjusted under 35 U.S.C. 154(b) by 0 days.

(21) Appl. No.: 13/752,359

(22) Filed: Jan. 28, 2013

(65) Prior Publication Data

US 2014/0211322 A1 Jul. 31, 2014

(51) Int. Cl.
*G02B 27/14* (2006.01)
*G02B 3/00* (2006.01)

(52) U.S. Cl.
USPC .................. 359/633; 359/634; 359/649

(58) Field of Classification Search
USPC ......................... 359/630–634, 649
See application file for complete search history.

(56) References Cited

U.S. PATENT DOCUMENTS

| | | | |
|---|---|---|---|
| 6,094,181 A | 7/2000 | Hildebrand et al. | |
| 6,449,023 B2 | 9/2002 | Swanson et al. | |
| 6,624,952 B2 * | 9/2003 | Kuwa et al. | 359/726 |
| 6,683,726 B2 * | 1/2004 | Endo et al. | 359/629 |
| 6,847,489 B1 | 1/2005 | Wu | |
| 6,910,777 B2 * | 6/2005 | Ito | 353/31 |
| 7,502,168 B2 | 3/2009 | Akutsu et al. | |
| 7,800,827 B2 | 9/2010 | Moliton et al. | |
| 2002/0141083 A1 | 10/2002 | Chen | |
| 2006/0228073 A1 | 10/2006 | Mukawa et al. | |
| 2010/0046070 A1 | 2/2010 | Mukawa | |
| 2010/0066926 A1 | 3/2010 | Tanijiri | |

FOREIGN PATENT DOCUMENTS

| | | |
|---|---|---|
| WO | 9815868 | 4/1998 |
| WO | 2010/044356 A1 | 4/2010 |

OTHER PUBLICATIONS

Rolland, et al., "Development of Head-Mounted Projection Displays for Distributed, Collaborative, Augmented Reality Applications", In Journal of Presence: Teleoperators and Virtual Environments—Special Issue: Immersive Projection Technology, vol. 14, No. 5, Oct. 2005, pp. 528-549.
CRL Opto Limited, "Application Note—HMDs and Microdisplays (Basics)", [Retrieved from the Internet Aug. 15, 2012 : http://www.loreti.it/Download/PDF/SLM/HMDs%20and%20Microdisplays%20Basics.pdf], 2003, 8 pages.
"International Search Report & Written Opinion for PCT Application No. PCT/US2014/012410", Mailed Date: Jun. 18, 2014, Filed Date: Jan. 22, 2014, 8 Pages.

* cited by examiner

*Primary Examiner* — Mohammed Hasan
(74) *Attorney, Agent, or Firm* — Micah Goldsmith; Peter Taylor; Micky Minhas

(57) ABSTRACT

Technology is described for a projection optical system which optically couples image light from an image source to a near-eye display (NED) of a wearable near-eye display device. The projection optical system and the image source make up a projection light engine. Light from the image source is directed to a birdbath reflective optical element which is immersed in high index glass. The image light is reflected and collimated by the birdbath element and travels outside a housing of the projection light engine forming an external exit pupil, meaning the exit pupil is external to the projection light engine. A waveguide optically couples the image light of the external exit pupil. An example of a waveguide which can be used is a surface relief grating waveguide.

20 Claims, 8 Drawing Sheets

PROJECTION OPTICAL SYSTEM FOR COUPLING IMAGE LIGHT TO A NEAR-EYE DISPLAY

BACKGROUND

A near-eye display (NED) device, such as a head mounted display (HMD) device, may be worn by a user for experiences such as an augmented reality (AR) experience and a virtual reality (VR) experience. A projection light engine generates image data for display in a field of view of the NED device. The efficiency with which light from the projection light engine is coupled to a near-eye display affects image quality and power consumption as the engine has to provide more illumination to make up for lost light. Coupling light at an exit pupil is very efficient as the exit pupil is an area where a beam of light representing an image has the smallest cross section and contains the full image for display. However, many projection light engines have an internal exit pupil meaning the exit pupil is internal to the optics of the projection light engine. Coupling light from a projection light engine with an internal exit pupil is much less efficient due to additional optics to recapture the image data after it has left the exit pupil and optical power of the image light is weakened as it has to pass through more optics. A display which is able to directly access the image data at the exit pupil is much more power efficient in providing a quality image.

SUMMARY

The technology provides one or more embodiments for coupling image light of an external exit pupil of a projection light engine into a near-eye display (NED) of a NED device. An embodiment of a projection optical system of a projection light engine for coupling image light from an image source of the projection light engine to a near-eye display comprises a support structure of a near-eye display device which may be worn by a user. A high index glass region is supported by the support structure. A birdbath optical element having a reflective surface is immersed in the high index glass region and positioned by the support structure for optically coupling image light from the image source. The birdbath optical element collimates and reflects the image light through the high index glass region to an external exit pupil. An external exit pupil is external to the projection light engine.

The technology provides one or more embodiments of a near-eye display (NED) device. An embodiment of a NED device comprises a near-eye support structure which supports a near-eye display (NED) which includes a waveguide. A projection light engine which includes an image source and a projection optical system is also supported by the near-eye support structure and has an external exit pupil. The projection optical system comprises a high index glass region in which a birdbath optical element with a reflective surface is immersed. The birdbath optical element collimates and reflects image light from the image source to the external exit pupil, and the near-eye support structure positions the waveguide for optically coupling the image light of the external exit pupil.

The technology provides one or more embodiments of a method for coupling image light from an image source of a projection light engine to a near-eye display. An embodiment of the method comprises optically directing the image light from the image source along a first optical path in a high index glass region within a projection optical system housing to a birdbath reflective optical element in the high index glass region. The image light is collimated and reflected by the birdbath reflective optical element along a second optical path extending through the high index glass region to an external exit pupil outside the projection optical system housing. The image light may be polarized in at least one of the first optical path and the second optical path, and an input grating of a waveguide of the near-eye display optically couples at least the image light of the exit pupil into the waveguide.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

An example of a near-eye display (NED) device is a head mounted display (HMD) device which is a user wearable mobile computer device. Practical considerations of weight, size, and battery life can be key features in making a consumer wearable computer device useful, and thus marketable, for addressing mobility and comfort demands of users who expect their computer devices to move with them. Coupling image light into a near-eye display (NED) at an exit pupil increases efficiency by cutting down on illumination power and provides good image quality. A projection light engine with an external exit pupil allows a NED to take advantage of this increased efficiency and image quality. Again, the exit pupil is an area where a beam of light representing an image has the smallest cross section and contains the full image for display.

Figure 1:
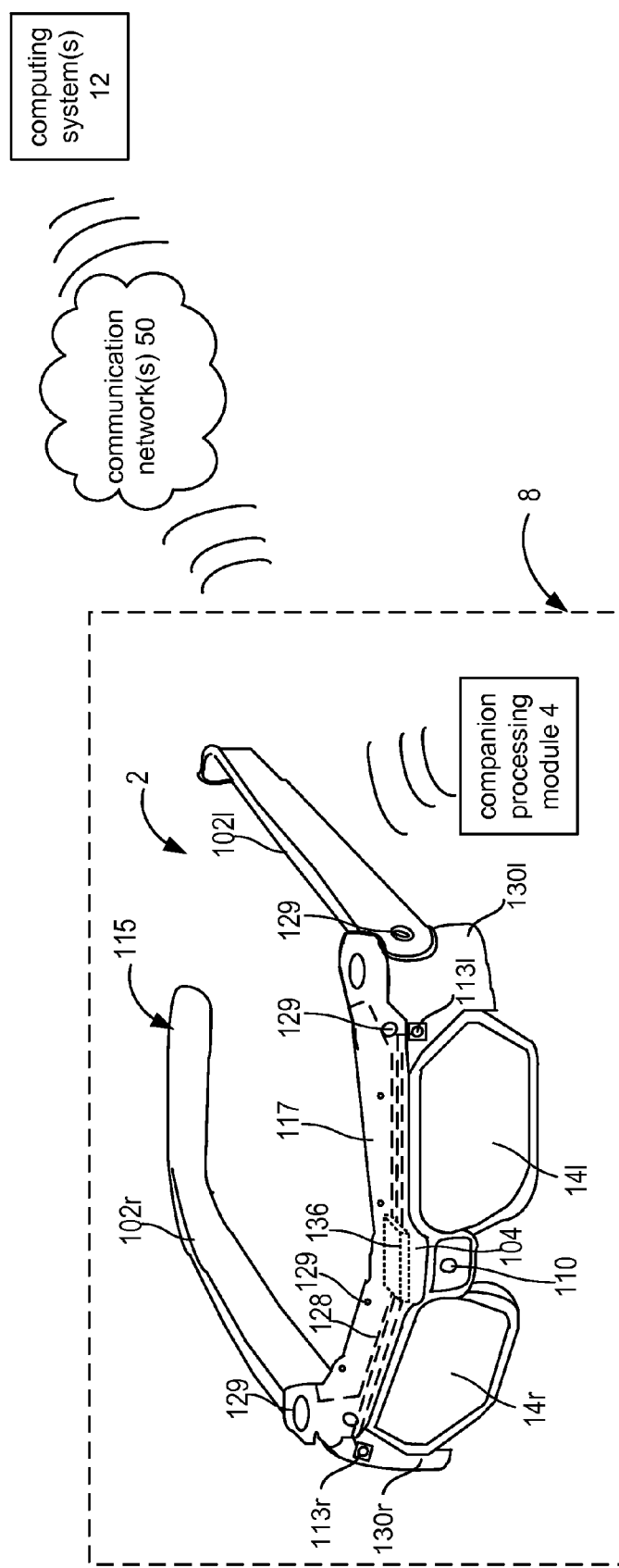
FIG. 1 is a block diagram depicting example components of an embodiment of a near-eye display (NED) device system.

FIG. 1 is a block diagram depicting example components of an embodiment of a near-eye display (NED) device system. In the illustrated embodiment, the system includes a near-eye display (NED) device as a head mounted display (HMD) device 2 which is communicatively coupled to another computer system identified as a companion processing module 4. Wireless communication is illustrated in this example, but communication via a wire between module 4 and the display device 2 may also be implemented.

In this embodiment, NED device 2 is in the shape of eyeglasses in a frame 115, with a respective display optical system 14 (14l and 14r) positioned at the front of the NED device to be seen through by each eye when the NED is worn by a user. In this embodiment, each display optical system 14 uses a projection display in which image data is projected into a user's eye to generate a display of the image data so that the image data appears to the user at a location in a three dimensional field of view in front of the user. For example, a user may be playing a shoot down enemy helicopter game in an optical see-through mode in his living room. An image of a helicopter appears to the user to be flying over a chair in his living room, not between optional lenses 116 and 118, shown in FIG. 2B, as a user cannot focus on image data that close to the human eye. Each display optical system 14 is also referred to as a display, and the two display optical systems 14 together may also be referred to as a display.

In this embodiment, frame 115 provides a convenient eyeglass frame as a near-eye support structure for holding elements of the NED device 2 in place as well as a conduit for electrical connections. Some other examples of a near-eye support structure are a visor frame or a goggles support. The frame 115 includes a nose bridge 104, a front top cover section 117, a respective projection light engine housing 130 for each of a left side (130l) and a right side (130r) of the device as well as left and right temples or side arms 102l and 102r which are designed to rest on each of a user's ears. In this embodiment, nose bridge 104 includes a microphone 110 for recording sounds and transmitting audio data to control circuitry 136. On the exterior of the side housing units 130l and 130r are respective outward facing cameras 113l and 113r which capture image data of the real environment in front of the user for mapping what is in a field of view of a near-eye display (NED).

In this embodiment, dashed lines 128 are illustrative examples of some electrical connection paths which connect to control circuitry 136, also illustrated in dashed lines. One dashed electrical connection line is labeled 128 to avoid overcrowding the drawing. The electrical connections and control circuitry 136 are in dashed lines to indicate they are under the front top cover section 117 in this example. There may also be other electrical connections (not shown) including extensions of a power bus in the side arms for other components, some examples of which are sensor units including additional cameras, audio output devices like earphones or units, and perhaps an additional processor and memory. Some examples of connectors 129 as screws are illustrated which may be used for connecting the various parts of the frame together.

Figure 7:
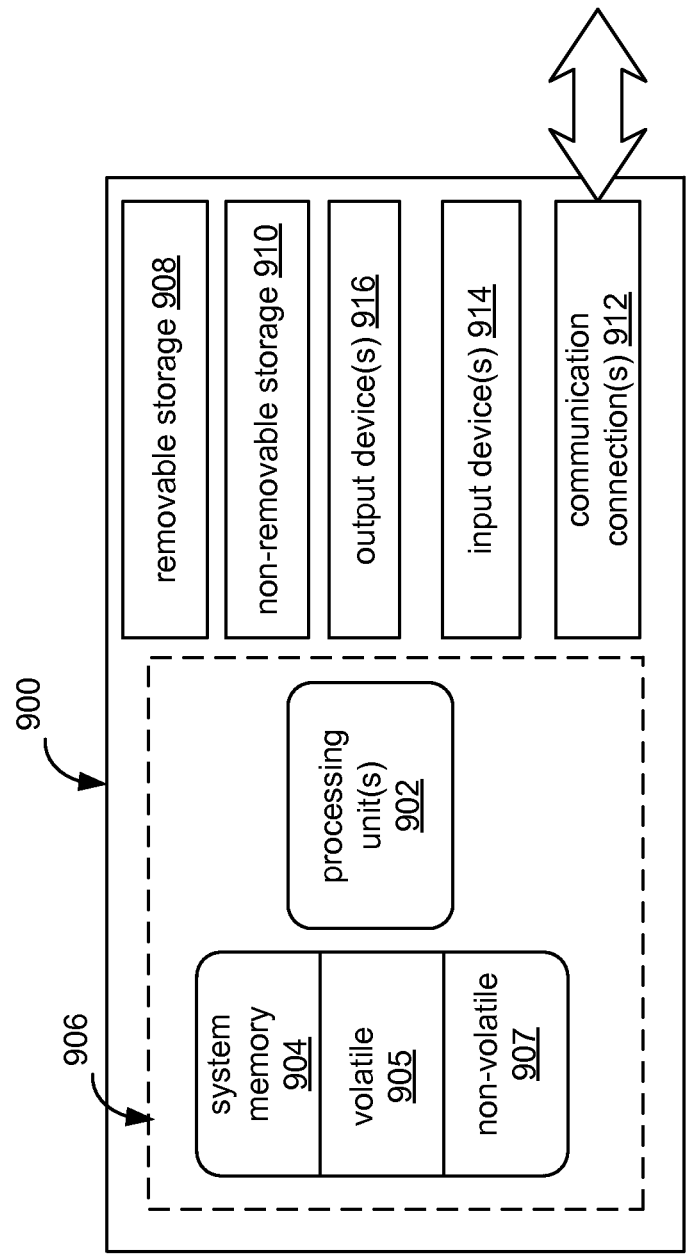
FIG. 7 is a block diagram of one embodiment of a computer system that can be used to implement a network accessible computer system, a companion processing module or control circuitry of a near-eye display device.

The companion processing module 4 may take various embodiments. In some embodiments, companion processing module 4 is in a portable form which may be worn on the user's body, e.g. a wrist, or be a separate portable computer system like a mobile device (e.g. smartphone, tablet, laptop). The companion processing module 4 may communicate using a wire or wirelessly (e.g., WiFi, Bluetooth, infrared, an infrared personal area network, RFID transmission, wireless Universal Serial Bus (WUSB), cellular, 3G, 4G or other wireless communication means) over one or more communication networks 50 to one or more network accessible computer systems 12, whether located nearby or at a remote location. In other embodiments, the functionality of the companion processing module 4 may be integrated in software and hardware components of the display device 2. Some examples of hardware components of the companion processing module 4 are shown in FIG. 7.

One or more network accessible computer system(s) 12 may be leveraged for processing power and remote data access. An example of hardware components of a computer system 12 is shown in FIG. 7. The complexity and number of components may vary considerably for different embodiments of the computer system 12 and the companion processing module 4.

Image data is identified for display based on an application, e.g. a game or messaging application, executing on one or more processors of the control circuitry 136, or the companion processing module 4 or a remote computer system 12 providing image data to the near-eye display 14, or a combination of these.

Figure 2A:
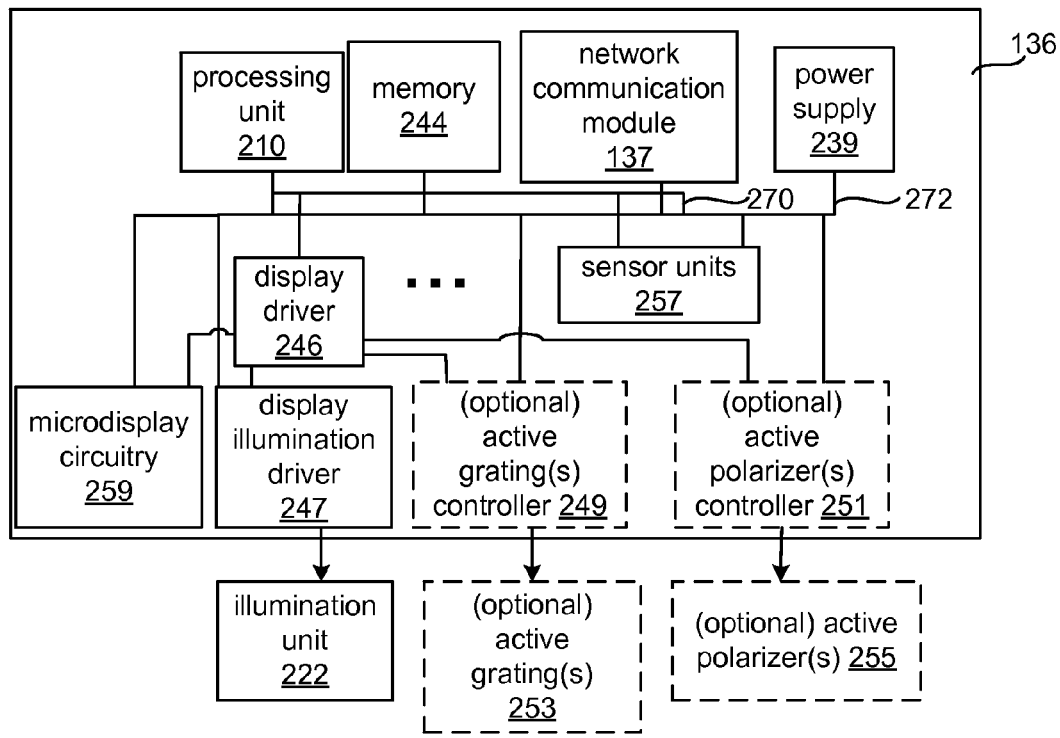
FIG. 2A is a block diagram of example hardware components including a computer system within control circuitry of a NED device.

FIG. 2A is a block diagram of example hardware components including a computer system within control circuitry of a NED device. Control circuitry 136 provides various electronics that support the other components of head mounted, near-eye display device 2. In this example, the control circuitry 136 for the display device 2 comprises a processing unit 210, a memory 244 accessible to the processing unit 210 for storing processor readable instructions and data, a communication module 137 communicatively coupled to the processing unit 210 which can act as a network interface for connecting the NED device to another computer system such as the companion processing module 4, a computer system of another NED device or one which is remotely accessible over the Internet. A power supply 239 provides power for the components of the control circuitry 136 and the other components of the display device 2 like the capture devices 113, the microphone 110, other sensor units, and for power drawing components for displaying image data on the display 14 such as light sources and electronic circuitry associated with an image source like a microdisplay in a projection light engine.

The processing unit 210 may comprise one or more processors including a central processing unit (CPU) and a graphics processing unit (GPU), particularly in embodiments without a separate companion processing module 4 which contains at least one graphics processing unit (GPU). Memory 244 is representative of the various types of memory which may be used by the system such as random access memory (RAM) for application use during execution, buffers for sensor data including captured image data and display data, read only memory (ROM) or Flash for instructions and system data, and other types of nonvolatile memory for storing other items, some examples of which are applications and user profile data. In this example, an electrical connection of a data bus 270 connects the sensor units 257, the display driver 246, processing unit 210, memory 244, and the communication module 137. The data bus 270 also derives power from the power supply 239 through a power bus 272 to which all the illustrated elements of the control circuitry are connected for drawing power.

Figure 2B:
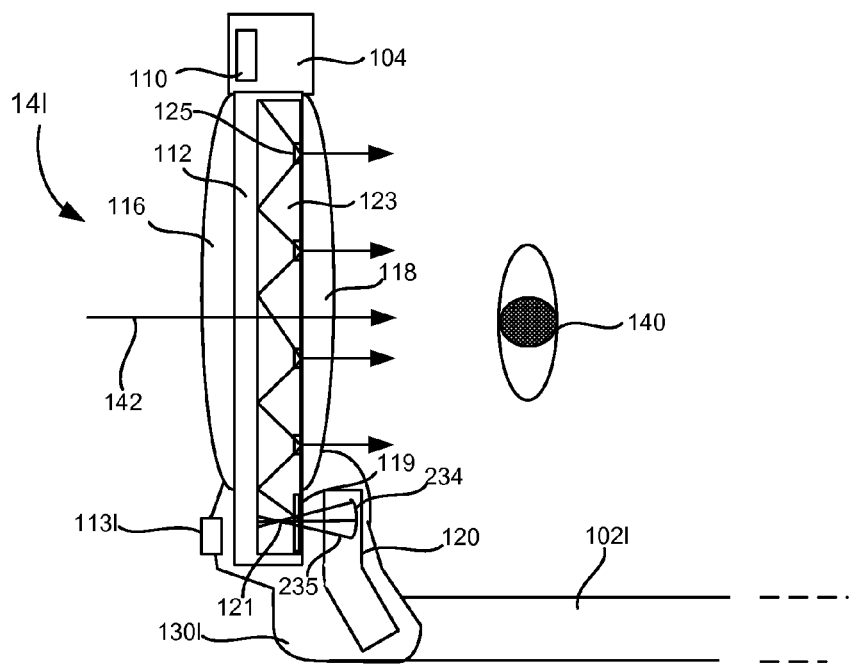
FIG. 2B is a top view of an embodiment of a near-eye display being coupled with a projection light engine having an external exit pupil.

The control circuitry further comprises a display driver 246 for selecting digital control data, e.g. control bits, to represent image data which digital control data may be decoded by microdisplay circuitry 259 and different active component drivers of a projection light engine (e.g 120 in FIG. 2B). A microdisplay may be an active transmissive, emissive or reflective device. For example, a microdisplay may be a liquid crystal on silicon (LCoS) device requiring power or a micromechanical machine (MEMs) based device requiring power to move individual mirrors. An example of an active component driver is a display illumination driver 247 which converts digital control data to analog signals for driving an illumination unit 222 which includes one or more light sources like one or more lasers or light emitting diodes (LEDs). In some embodiments, a display unit may include one or more active gratings 253, such as for a waveguide, for coupling the image light at the exit pupil from the projection light engine. An active grating(s) controller 249 converts digital control data into signals for changing the properties of one or more gratings. Similarly, one or more polarizers of a projection light engine may be active polarizers 255 which an optional active polarizer(s) controller 251 may drive. The control circuitry 136 may include other control units not illustrated here but related to other functions of a NED device such as providing audio output, identifying head orientation and location information.

FIG. 2B is a top view of an embodiment of a near-eye display 14*l* being coupled with a projection light engine 120 having an external exit pupil 121. In order to show the components of the display optical system 14, in this case 14*l* for the left eye, a portion of the top frame section 117 covering the display 14*l* and the projection light engine 120 is not depicted. Arrow 142 represents an optical axis of the display optical system 14*l*.

In this embodiment, the displays 14*l* and 14*r* are optical see-through displays. In other embodiments, they can be video-see displays. Each display includes a display unit 112 illustrated between two optional see-through lenses 116 and 118 and including a waveguide 123. The optional lenses 116 and 118 are protective coverings for the display unit. One or both of them may also be used to implement a user's eyeglass prescription. In this example, eye space 140 approximates a location of a user's eye when the device 2 is worn. The waveguide directs image data in the form of image light from a projection light engine 120 towards the user eye space 140 while also allowing light from the real world to pass through towards the user's eye space, thereby allowing the user to have an actual direct view of the space in front of NED device 2 in addition to seeing an image of a virtual feature from the projection light engine 120.

In this top view, the projection light engine 120 includes a birdbath reflective optical element 234 illustrated as a curved surface. The curved surface provides optical power to the beams 235 of light it reflects, thus collimating them as well. Only one beam is labeled to prevent overcrowding the drawing. In some embodiments, the radius of curvature of the birdbath optical element is at least −38 millimeters (mm). The beams are collimated but come from different angles as they reflect from different points of the curved surface. Thus, the beams will cross and form the exit pupil at the smallest cross-section of themselves.

Figure 3A:
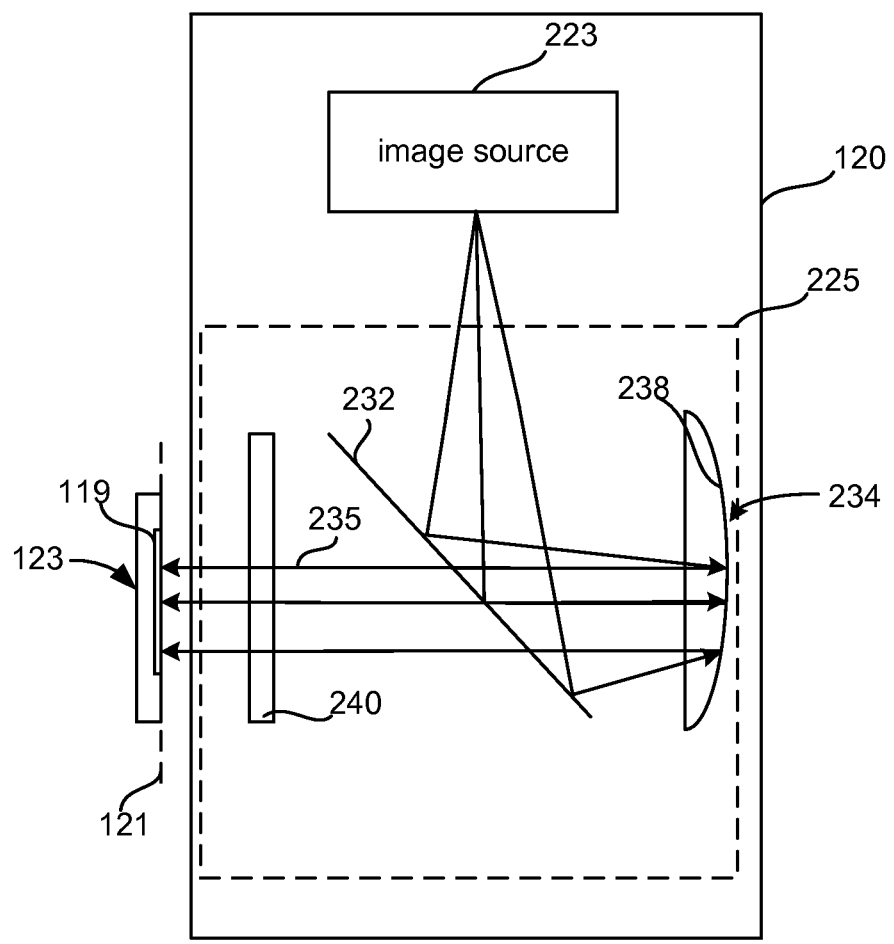
FIG. 3A is a block diagram of an embodiment of a projection light engine using a birdbath optical element immersed in high index glass for providing an external exit pupil.

In some embodiments, the waveguide 123 may be a diffractive waveguide. Additionally, in some examples, the waveguide 123 is a surface relief grating (SRG) waveguide. An input grating 119 couples the image light from the projection light engine 120. Additionally, the waveguide has a number of exit gratings 125 for the image light to exit the waveguide in the direction of the user eye space 140. One exit grating 125 is labeled to avoid overcrowding the drawing. In this example, the outermost input grating 119 is wide enough and positioned to capture light exiting the projection light engine 120 before the light exiting the projection light engine has reached its exit pupil 121. The optically coupled image light forms its exit pupil in this example at a central portion of the waveguide. See FIG. 3B below for a more detailed example. FIG. 3A described below provides an example of a waveguide coupling the image light at the exit pupil with an input grating positioned at the exit pupil.

The exit pupil includes the light for the complete image being displayed, thus coupling light representing an image at the exit pupil captures the entire image at once, and is thus very efficient and provides the user a view of the complete image in the display 14. The input grating 119 is able to couple the image light of the exit pupil because the exit pupil is external to the projection light engine. In some examples, the exit pupil is 0.5 mm outside the projection light engine. In other examples, the exit pupil is projected 5 mm outside the projection light engine.

In the illustrated embodiment, the projection light engine 120 in a left side projection light engine housing 130*l* includes an image source, for example a microdisplay, which produces the image light and a projection optical system which folds an optical path of the image light to form the exit pupil 121 external to the projection light engine. The shape of the projection light engine 120 is an illustrative example adapting to the shape of the example housing 130*l* which conforms around a corner of the frame 115 in FIG. 1 reducing bulkiness. The shape may be varied to accommodate different arrangements of the projection light engine 120, for example due to different image source technologies implemented.

There are different image generation technologies that can be used to implement an image source. For example, a microdisplay can be implemented using a transmissive projection technology. In one example of such technology, a light source is modulated by optically active material and backlit with white light. These technologies are usually implemented using LCD type displays with powerful backlights and high optical energy densities. Other microdisplays use a reflective technology for which light from an illumination unit is reflected and modulated by an optically active material. The illumination may be a white source or RGB source, depending on the technology. Digital light processing (DLP), digital micromirror device (DMD), liquid crystal on silicon (LcOS) and Mirasol® display technology from Qualcomm, Inc. are all examples of reflective technologies which are efficient as most energy is reflected away from the modulated structure and may be used by the display. Additionally, a microdisplay can be implemented using an emissive technology where light is generated by the display. An example of an emissive technology is organic light emitting diode (OLED) technology.

FIG. 2B shows half of the head mounted display device 2. For the illustrated embodiment, a full head mounted display device 2 may include another display optical system 14 with another set of optional see-through lenses 116 and 118, another waveguide 123, as well as another projection light engine 120, and another of outward facing capture devices 113. In some embodiments, there may be a continuous display viewed by both eyes, rather than a display optical system for each eye. In some embodiments, a single projection light engine 120 may be optically coupled to a continuous display viewed by both eyes or be optically coupled to separate displays for the eyes. Additional details of a head mounted personal A/V apparatus are illustrated in U.S. patent application Ser. No. 12/905,952 entitled Fusing Virtual Content Into Real Content, Filed Oct. 15, 2010, fully incorporated herein by reference.

FIG. 3A is a block diagram of an embodiment of a projection light engine 120 using a birdbath optical element 234 immersed in a high index glass region 225 which helps in folding the optical path to provide an exit pupil 121 external to the projection light engine. Some examples of high index glass are flint glass and glass having an index of refraction of at least 1.65. This side view illustrates some exemplary basic elements associated with a birdbath projection optical system design. Additional optical elements may be present in various versions of the embodiment. An image source 223 generates image light which propagates into a high index glass region 225 which includes an optical directing element 232, a birdbath optical element 234 with a curved reflective surface 238 and one or more polarizing optical elements represented by polarizer 240. The optical directing element 232 directs the image light from the image source 223 to the reflective surface 238 of the birdbath optical element 234, e.g. a birdbath lens, and allows image light reflecting from the curved surface 238 to pass through and travel through polarizer 240. An example of the optical directing element 232 is a beam splitter, and the beam splitter may also act as a polarizer so the birdbath lens 234 receives polarized light which is again polarized by one or more polarizing optical elements 240. Some implementation examples of the one or more polarizing optical elements 240 may be passive optical elements like a red rotation waveplate or a quarter waveplate. Active polarizers may be used in some embodiments as discussed above.

The image light is polarized for more efficient coupling into one or more input gratings, such as the one or more input gratings of a diffractive waveguide. In some examples, a waveguide may have multiple layers, and the polarization of the incoming image light can be used for filtering the incoming light to different layers of the waveguide. Each layer has its own input grating and exit grating. An input grating for a layer couples light of a certain polarization into its layer. Light of other polarizations is passed through the input grating and the layer itself so that an input grating of the next layer either couples or passes the received light based on its polarization. In some implementations, different wavelength bands, such as for different colors, may be directed to different waveguide layers for enhancing brightness of the image. Light in the different wavelength bands may be polarized for coupling into a respective layer for each wavelength band. See for example, U.S. patent application Ser. No. 13/601,727 with a filing date of Aug. 31, 2012 entitled "NED Polarization System for Wavelength Pass-Through" to Nguyen et al. which is hereby incorporated by reference.

The arrangement of one or more polarizing optical elements within the high index glass region 225 may be based on a number of factors including a number of layers in the waveguide 123, the types of gratings, e.g. surface relief gratings, and a predetermined criteria for distributing the image light among the layers. The beams 235 are collimated when reflected from the birdbath curved reflective surface 238, but each portion is reflecting from a different angle due to the curved surface. (See FIG. 3C for an example of a top view of multiple beams having their smallest cross-section at the exit pupil.) In this example, an input grating 119 of a waveguide 123 couples the reflected beam at about the exit pupil location 121. In this example, waveguide 123 may be a single layer waveguide. In other examples such as in FIG. 3B, a multi-layer waveguide may be implemented in the near-eye display 14.

Figure 3B:
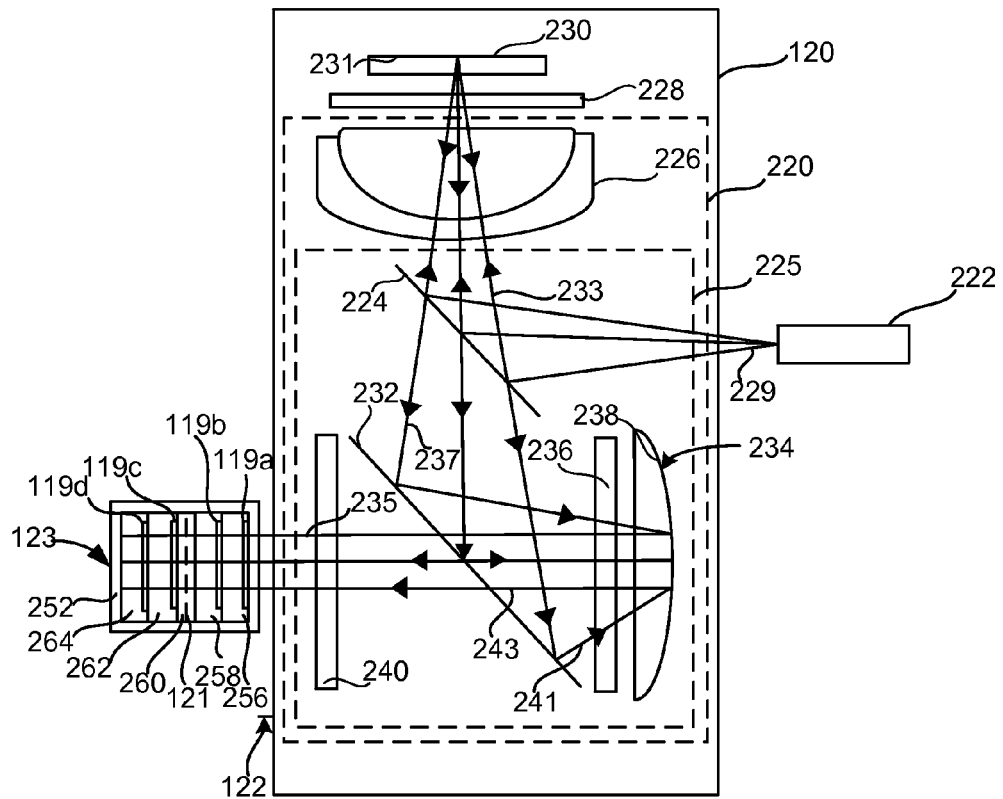
FIG. 3B is a block diagram of another embodiment of a projection light engine using a birdbath optical element immersed in high index glass.

FIG. 3B is a block diagram of another embodiment of a projection light engine using a birdbath optical element 234 immersed in high index glass. In this embodiment, high index glass having an index of refraction between 1.7 and 1.8 is used. In this embodiment, the projection light engine 120 includes an image source and a projection optical system 220. The image source is embodied as a reflective liquid crystal on silicon (LCoS) microdisplay 230 with an accompanying compensator optical element 228. In this embodiment, the microdisplay 230 has an LCoS surface 231 which reflects light from an illumination unit 222 for representing the image data to be displayed. The LCoS surface 231 polarizes light it reflects; however there may be polarization errors. A compensator 228 is a polarization optical element whose compensation parameters may be determined during manufacture of the LCoS to compensate for polarization errors measured for the LcOS surface during manufacture.

The projection optical system 220 in this embodiment includes a doublet 226 outside a high index glass region 225 and a number of optical components within the high index glass region 225. The doublet 226 corrects for chromatic aberration and also provides some collimation to the image light reflecting off the LCoS. Those optical elements comprise an illumination optical directing element embodied as a polarizing illumination beam splitter 224, another optical directing element embodied as a polarizing beam splitter 232, a quarter waveplate 236, a birdbath optical element 234 with a curved reflective surface 238 and another representative polarizer 240 embodied as including a red rotation waveplate 240. In other embodiments, like embodiments using a transmissive or emissive image source including its own illumination unit 222, besides omitting the doublet, the illumination beam splitter 224 may also be omitted from the projection optical system 220.

An optical path of light through these elements is discussed next. Different portions of the illumination light and image light are labeled with different numbers to facilitate discussing the progress of the light. To avoid overcrowding the drawing, only one representation ray of the beam is labeled at each stage of the path. Light 229 generated by the illumination unit 222 is directed to the polarizing illumination beam splitter 224 which directs the light 233 in the direction of the LCoS surface 231. While traveling to the surface 231, the illumination light passes through the doublet lens 226 and the compensator 228. Some examples of illumination sources which the illumination unit 222 may include are light emitting diodes (LEDs) and lasers. In some embodiments, there may be separate red, green and blue illumination sources, and in other embodiments, there may be a white light source and filters used to represent different colors.

In this embodiment, a color sequential LED device is used in the illumination unit 222. The color sequential device includes red, blue and green LEDs which are turned on in a sequential manner in timing with the LCoS for making a full color image. In other examples, lasers rather than LEDs may be used. Individual display elements on the LCoS surface 231 are controlled by the microdisplay circuitry 259 to reflect or absorb the red, green and blue light to represent the color or shade of gray for grayscale indicated by the display driver 246 for the image data.

The image light 237 polarized and reflected from the LCoS surface 231 and compensator 228 is collimated or increased in optical power by the doublet 226 due to its curved surfaces. The image light 237 enters the high index glass region 225, passes through the illumination beam splitter 224 and intercepts polarizing beam splitter 232 which directs the again polarized reflected light 241 through the quarter waveplate 236, which again passively alters the polarization state of the reflected light, to the curved reflective surface 238 of the birdbath optical element 234 which collimates and reflects the image light back through the quarter waveplate 236 for another polarization state alteration. The quarter waveplate provides circular polarization while the polarizing beam splitters 224, 232 generally act as linear polarizers. The birdbath reflected, and twice quarter turned, image light 243 passes through beam splitter 232 and the polarizination state is altered yet again by red rotation plate 240. The red rotation waveplate rotates the polarization state of red wavelengths through ninety (90) degrees. The image light 235 then exits the projection light engine for optical coupling into waveguide 123.

As mentioned above, immersing optical elements in high index glass extends the optical path length enough to allow for folds that project the exit pupil to a point external to the projection light engine 120. Coupling light at the exit pupil within the waveguide significantly increases the efficiency of the light coupling, thus reducing power.

A cross-sectional side view of the waveguide 123 is shown in FIG. 3B. The waveguide 123 extends into the page and into the near-eye display 14 approximately parallel to the eye area 140 and extends a much smaller amount out of the page. In this embodiment, the waveguide 123 is multi-layered with four exemplary layers, 256, 258, 262 and 264, and a center waveplate 260, in this example. Line 122 indicates a distance between the projection light engine 120 and the waveguide 123. The image is not drawn to scale, but an example of such a distance between the light engine and the waveguide is about 0.5 mm. In center waveplate 260 is a target location for the exit pupil to be projected. In this example, again not drawn to scale, the exit pupil is projected about 5 mm from the outside of the projection light engine 120 to the center waveplate 260 of the waveguide. Additionally, in this example, the waveguide 123 has an index of refraction about 1.7 which is in the range of high index glass.

In this example, an outer protective covering 252 of see-through glass surrounds the waveguide through which the image light 235 passes. The waveguide 123 is positioned within housing 130 for optical coupling of the image light of the exit pupil 121 in the center waveplate 260. Each of the four layers has its own input grating. An example of an input grating is a surface relief grating manufactured as part of the surface of each layer in the waveguide 123. Layer 256 first receives the image light 235 which has exited the projection light engine and couples that light through its optical input grating 119*a*. Similarly, layer 258 couples the image light 235 through its optical input grating 119*b*. The center waveplate layer 260 couples and changes the polarization state of the image light 235 it has received including the exit pupil. Layer 262 via optical input grating 119*c* couples the image light 235 as its cross section expands, and layer 264 couples the image light 235 with its optical grating 119*d* as the cross section of the image light 235 continues to expand.

Figure 3C:
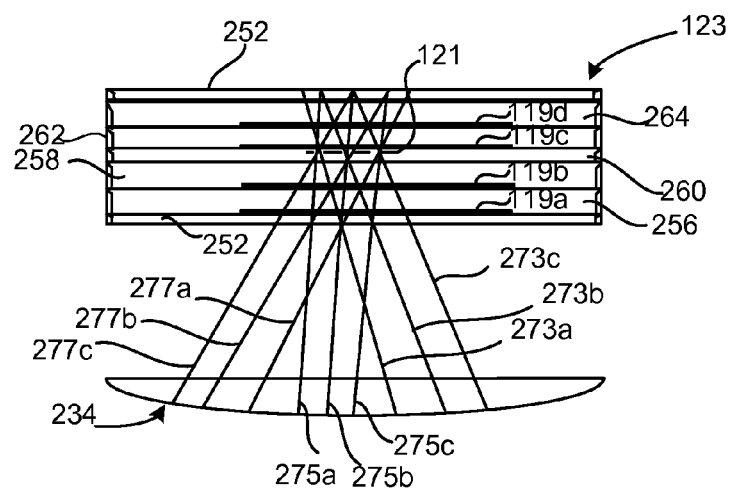
FIG. 3C is a block diagram illustrating a top view of layers of a waveguide example illustrated in FIG. 3B.

FIG. 3C is a block diagram illustrating a top view of the four layers and the center waveplate of the waveguide 123 example in FIG. 3B illustrated with the birdbath optical element 234 for reference (not drawn to scale). The intervening elements are not shown to more easily show the beams 273, 275 and 277. Each set of three rays (e.g. 273*a*, 273*b*, 273*c*) represents a beam (e.g. 273). Each beam may include light representing a plurality of colors. Each beam is collimated as discussed above. As the beams reflect from different points on the curved surface, different portions of the beams, here illustrated as rays cross, and the narrowest cross section of the beams occurs at the exit pupil 121. In some examples, the exit pupil diameter is about 3.0 mm (again not drawn to scale).

Figure 4:
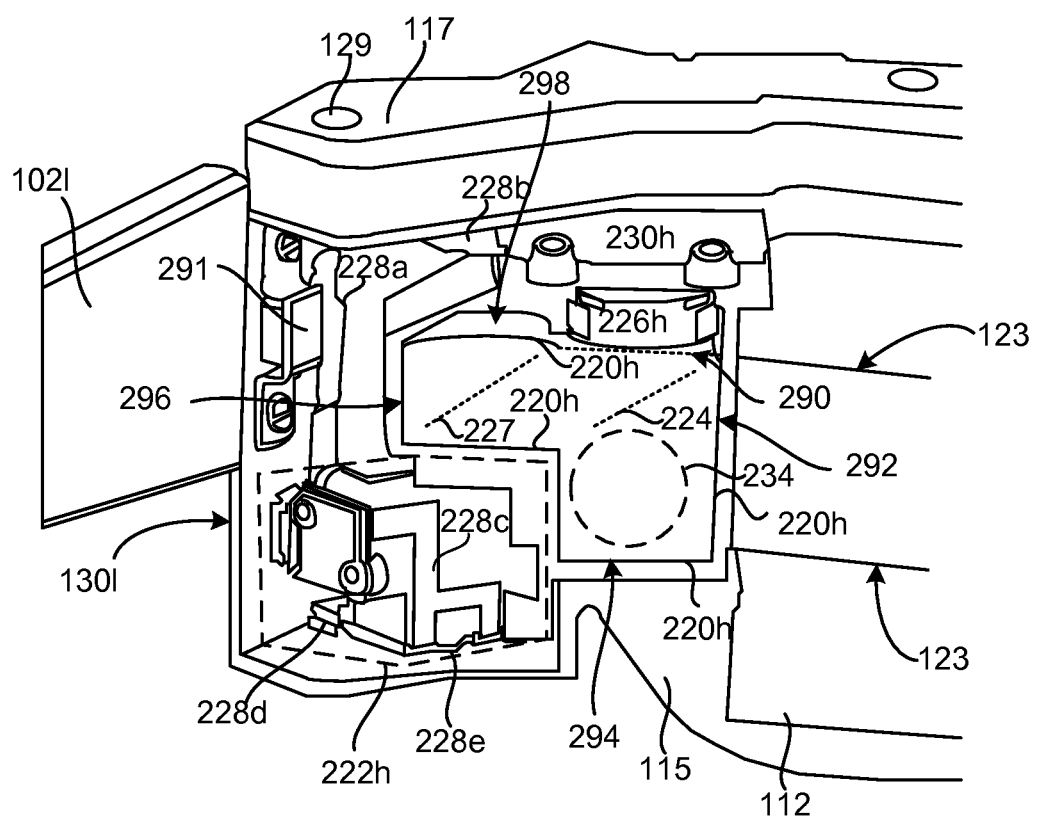
FIG. 4 illustrates an embodiment of a supporting housing structure for positioning an embodiment of a projection light engine with an external exit pupil for optical coupling with a near-eye display in a NED device using an eyeglass frame.

FIG. 4 illustrates an embodiment of a supporting housing structure 130*l* for positioning an embodiment of a projection light engine with an external exit pupil for optical coupling with a near-eye display in a NED device using an eyeglass frame. The supporting housing structure 130*l* is also referred to as the projection light engine housing 130*l*. This view illustrates an example of how projection light engine components may be fitted within the housing 130*l*. A protective covering is removed to see the exemplary arrangement.

The housing 130*l* is connected and adjacent to frame top section 117 and left side arm 102*l* as well as a portion of frame 115 surrounding a left side display unit 112. In this example, a power supply feed 291 is located on the upper left interior of the housing providing power from power supply 239 for various components. Throughout the housing 130*l* are various exemplary electrical connections 228 (228*a*, 228*b*, 228*c*, 228*d*, and 228*e*) for providing power as well as data representing instructions and values to the various components. An example of an electrical connection is a flex cable such as 228*b* which interfaces with the control circuitry 136 which may be inside the frame top section 117 as in FIG. 1 or elsewhere such as on or within a side arm 102.

Starting in the lower left is a housing structure 222*h* which encompasses components within the three dimensional space surrounded by the dashed line labeled 222*h* and which provides support and a protective covering for components of the illumination unit 222 such as the one or more light sources of the unit 222 and one or more of the display illumination drivers 247 which convert digital instructions to analog signals to drive one or more light sources like lasers or LEDs making up the illumination unit 222. Flex cable 228*c* also provides electrical connections. In this example, the illumination is directed onto an optical directing element 227 such as a mirror, which is within a projection optical system housing 220*h*. Additional elements, like another polarizer, may follow between the directing element 227 and the illumination beam splitter 224 within the housing 220*h*.

The projection optical system housing 220*h* includes components of a projection optical coupling system 220 such as the embodiments discussed previously. In this embodiment, housing structure 220*h* below dashed line 290 extending to arrow 294 and including its section which extends slightly above the 290 dashed line as indicated by arrow 298 and which extends left as indicated by arrow 296, immerses the components in high index glass. In this view of the housing 220*h*, the illumination reflected from element 227 is directed to the illumination beam splitter 224 which directs light through doublet 226 in the doublet housing 226*h* to an LCoS chip 230 positioned by housing 230*h* in this example above the doublet 226. The light reflected from the LCoS chip 230 as in the embodiment of FIG. 3B is polarized and reflected to the birdbath optical 234. The back of the curved reflective surface 238 of the birdbath element 234 is facing out of the page in this view. The reflected image light is reflected into the page where a portion of the waveguide 123 (not shown) with one or more input gratings extends to the left of the display unit 112 and behind the projection optical system housing 220*h* in this view in order to couple the image light of the external exit pupil 121 (not shown).

In some embodiments, the distance from the top of the LCoS housing 230*h* to the vertical bottom of the projection optical housing 220*h* indicated by arrow 294 is within 20 millimeters. In one example, it is about 17 mm. The components arranged in such an example include the LCoS 230, compensator 228, doublet 226, illumination beam splitter 224, the polarizing beam splitter 232, the birdbath optical element 234 and the polarizers 236 and 240 as arranged in the embodiment of FIG. 3B. Additionally, the projection optical housing 220*h* from its leftmost side 296 to the right side at arrow 292 extends within 30 millimeters.

Figure 5:
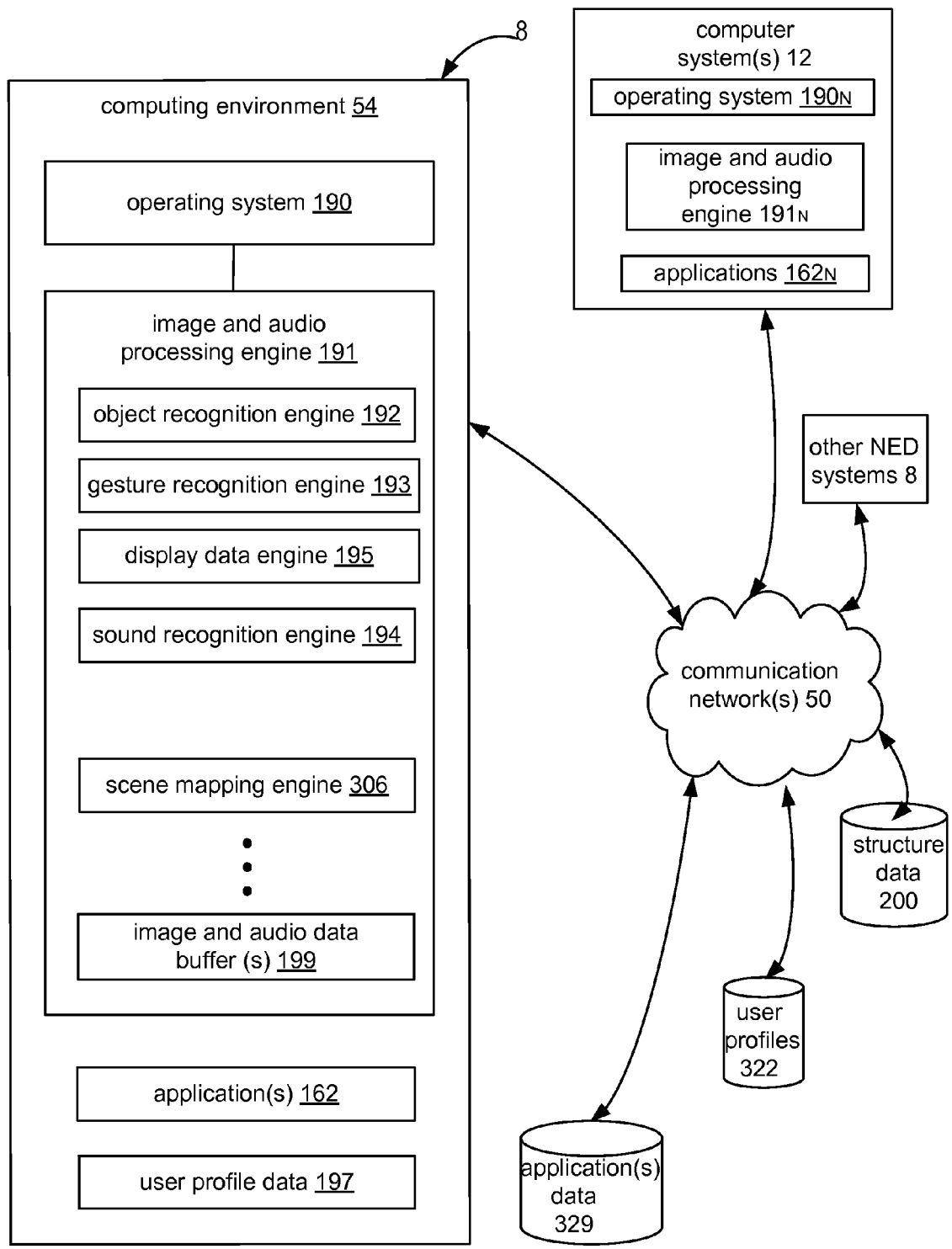
FIG. 5 is a block diagram of an embodiment of a system from a software perspective for displaying image data by a near-eye display device.

FIG. 5 is a block diagram of an embodiment of a system from a software perspective for displaying image data by a near-eye display device. FIG. 5 illustrates an embodiment of a computing environment 54 from a software perspective which may be implemented by a system like NED system 8, one or more remote computer systems 12 in communication with one or more NED systems or a combination of these. Additionally, a NED system can communicate with other NED systems for sharing data and processing resources.

As noted above, an executing application determines which image data is to be displayed, some examples of which are emails, virtual books or game related images. In this embodiment, an application 162 may be executing on one or more processors of the NED system 8 and communicating with an operating system 190 and an image and audio processing engine 191. In the illustrated embodiment, a remote computer system 12 may also be executing a version 162N of the application as well as other NED systems 8 with which it is in communication for enhancing the experience.

Application data 329 for one or more applications may also be stored in one or more network accessible locations. Some examples of application data 329 may be one or more rule datastores for rules linking action responses to user input data, rules for determining which image data to display responsive to user input data, reference data for natural user input like for one or more gestures associated with the application which may be registered with a gesture recognition engine 193, execution criteria for the one or more gestures, voice user input commands which may be registered with a sound recognition engine 194, physics models for virtual objects associated with the application which may be registered with an optional physics engine (not shown) of the image and audio processing engine 191, and object properties like color, shape, facial features, clothing, etc. of the virtual objects and virtual imagery in a scene.

As shown in the embodiment of FIG. 5, the software components of a computing environment 54 comprise the image and audio processing engine 191 in communication with an operating system 190. The illustrated embodiment of an image and audio processing engine 191 includes an object recognition engine 192, gesture recognition engine 193, display data engine 195, a sound recognition engine 194, and a scene mapping engine 306. Additional functionality may be added as indicated by . . . The individual engines and data stores provide a supporting platform of data and tasks which an application 162 can leverage for implementing its one or more functions by sending requests identifying data for processing and receiving notification of data updates. The operating system 190 facilitates communication between the various engines and applications. The operating system 190 makes available to applications which objects have been identified by the object recognition engine 192, gestures the gesture recognition engine 193 has identified, which words or sounds the sound recognition engine 194 has identified, and the positions of objects, real and virtual from the scene mapping engine 306.

The computing environment 54 also stores data in image and audio data buffer(s) 199 which provide memory for image data and audio data which may be captured or received from various sources as well as memory space for image data to be displayed. The buffers may exist on both the NED, e.g. as part of the overall memory 244, and may also exist on the companion processing module 4.

In many applications, virtual data is to be displayed in relation to a real object in the real environment. The object recognition engine 192 of the image and audio processing engine 191 detects and identifies real objects, their orientation, and their position in a display field of view based on captured image data and captured depth data from outward facing image capture devices 113 if available or determined depth positions from stereopsis based on the image data of the real environment captured by the capture devices 113. The object recognition engine 192 distinguishes real objects from each other by marking object boundaries, for example using edge detection, and comparing the object boundaries with structure data 200. Besides identifying the type of object, an orientation of an identified object may be detected based on the comparison with stored structure data 200. Accessible over one or more communication networks 50, structure data 200 may store structural information such as structural patterns for comparison and image data as references for pattern recognition. Reference image data and structural patterns may also be available in user profile data 197 stored locally or accessible in cloud based storage 322.

The scene mapping engine 306 tracks the three dimensional (3D) position, orientation, and movement of real and virtual objects in a 3D mapping of the display field of view where image data is to be displayed or in a 3D mapping of a volumetric space about the user based on communications with the object recognition engine 192 and one or more executing applications 162 causing image data to be displayed.

An application 162 identifies a target 3D space position in the 3D mapping of the display field of view for an object represented by image data and controlled by the application. For example, the helicopter shoot down application identifies changes in the position and object properties of the helicopters based on the user's actions to shoot down the virtual helicopters. The display data engine 195 performs translation, rotation, and scaling operations for display of the image data at the correct size and perspective. The display data engine 195 relates the target 3D space position in the display field of view to display coordinates of the display unit 112. For example, the display data engine may store image data for each separately addressable display location or area, e.g. a pixel, in a Z-buffer and a separate color buffer. The display driver 246 translates the image data for each display area to digital control data instructions for microdisplay circuitry 259 or the display illumination driver 247 or both for controlling display of image data by the image source.

The technology may be embodied in other specific forms without departing from the spirit or essential characteristics thereof. Likewise, the particular naming and division of modules, routines, applications, features, attributes, methodologies and other aspects are not mandatory, and the mechanisms that implement the technology or its features may have different names, divisions and/or formats.

For illustrative purposes, the method embodiments below are described in the context of the system and apparatus embodiments described above. However, the method embodiments are not limited to operating in the system embodiments described above and may be implemented in other system embodiments. Furthermore, the method embodiments may be continuously performed while the NED system is in operation and an applicable application is executing.

Figure 6:
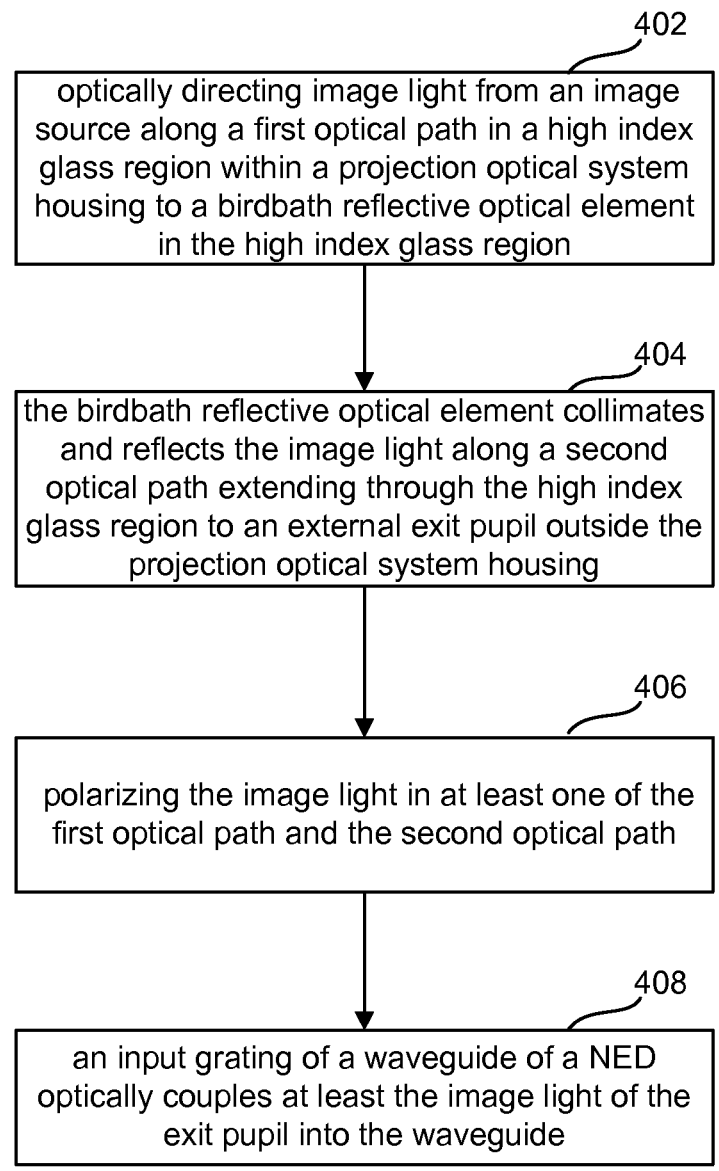
FIG. 6 is a flowchart of an embodiment of a method for coupling image light from an image source of a projection light engine into a near-eye display of the near-eye display (NED) device.

FIG. 6 is a flowchart of an embodiment of a method for coupling image light from an image source of a projection light engine into a near-eye display of the near-eye display (NED) device. In this embodiment, the method comprises in step 402 optically directing image light from the image source along a first optical path in a high index glass region within a projection optical system housing to a birdbath reflective optical element in the high index glass region. As in the embodiments of FIGS. 3A and 3B, a beam splitter may be used in performing the optically directing step. The image light in step 404 is collimated and reflected by the birdbath reflective optical element along a second optical path extending through the high index glass region to an external exit pupil outside the projection optical system housing. Step 406 identifies that polarization of the image light may be performed in at least one, if not both, of the first optical path and the second optical path. In step 408, an input grating of a waveguide of the near-eye display optically couples at least the image light of the exit pupil into the waveguide.

FIG. 7 is a block diagram of one embodiment of a computer system that can be used to implement a network accessible computer system 12, a companion processing module 4, or another embodiment of control circuitry 136 of a near-eye display (NED) device which may host at least some of the software components of computing environment 54. FIG. 7 illustrates an exemplary computer system 900. In its most basic configuration, computing system 900 typically includes one or more processing units 902 including one or more central processing units (CPU) and one or more graphics processing units (GPU). Computer system 900 also includes memory 904. Depending on the exact configuration and type of computer system, memory 904 may include volatile memory 905 (such as RAM), non-volatile memory 907 (such as ROM, flash memory, etc.) or some combination of the two. This most basic configuration is illustrated in FIG. 7 by dashed line 906. Additionally, computer system 900 may also have additional features/functionality. For example, computer system 900 may also include additional storage (removable and/or non-removable) including, but not limited to, magnetic or optical disks or tape. Such additional storage is illustrated in FIG. 7 by removable storage 908 and non-removable storage 910.

Computer system 900 may also contain communication module(s) 912 including one or more network interfaces and transceivers that allow the device to communicate with other computer systems. Computer system 900 may also have input device(s) 914 such as keyboard, mouse, pen, voice input device, touch input device, etc. Output device(s) 916 such as a display, speakers, printer, etc. may also be included.

The example computer systems illustrated in the figures include examples of computer readable storage devices. A computer readable storage device is also a processor readable storage device. Such devices may include volatile and non-volatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A projection optical system of a projection light engine for coupling image light from an image source of the projection light engine to a near-eye display comprising:
   a support structure of a near-eye display device which may be worn by a user;
   a high index glass region supported by the support structure;
   a birdbath reflective optical element immersed in the high index glass region and positioned by the support structure for optically coupling image light from the image source; and
   the birdbath reflective optical element collimating and reflecting the image light through the high index glass region to an external exit pupil which is external to the projection light engine.

2. The projection optical system of claim 1 further comprising:
   one or more polarizers optically coupled in the high index glass region between the birdbath lens and the external exit pupil, the one or more polarizers polarizing the image light reflecting from the birdbath optical element.

3. The projection optical system of claim 2 further comprising:
   a beam splitter positioned by the support structure in the high index glass region between the image source and the birdbath optical element for optically coupling the image light from the image source to the birdbath optical element.

4. The projection optical system of claim 3 wherein the one or more polarizers further comprises a quarter waveplate positioned by the support structure between the beam splitter and the birdbath optical element which quarter waveplate polarizes the image light from the image source travelling towards the birdbath optical element and polarizes the image light reflecting from the birdbath optical element.

5. The projection optical system of claim 3 further comprising the beam splitter is a polarizing beam splitter.

6. The projection optical system of claim 1 wherein the high index glass region includes flint glass.

7. The projection optical system of claim 1 wherein the high index glass region includes glass having an index of refraction of at least 1.65.

8. The projection optical system of claim 1 wherein the high index glass region includes glass having an index of refraction between 1.7 and 1.8.

9. The projection optical system of claim 1 wherein the external exit pupil is about five millimeters outside the projection light engine.

10. The projection optical system of claim 1 wherein the birdbath optical element has a radius of curvature of at least −38 mm.

11. A near-eye display device comprising:
    a near-eye support structure;
    a near-eye display (NED) supported by the near-eye support structure, the near-eye display including a waveguide;
    a projection light engine, including an image source and a projection optical system, supported by the near-eye support structure and having an external exit pupil which is external to the projection light engine;
    the projection optical system comprising a high index glass region in which a birdbath reflective optical element is immersed, the birdbath optical element collimates and reflects image light from the image source to the external exit pupil; and
    the near-eye support structure positions the waveguide for optically coupling the image light of the external exit pupil.

12. The near-eye display device of claim 11 wherein the waveguide is a diffractive waveguide.

13. The near-eye display device of claim 11 wherein the waveguide is a surface relief grating waveguide.

14. The near-eye display device of claim 11 wherein the waveguide is multi-layered; and
  wherein the near-eye support structure positions the waveguide for optically coupling the image light of the external exit pupil further comprises an input grating of the waveguide is positioned by the near-eye support structure to couple the image light of the external exit pupil within an inner layer of the multi-layered waveguide.

15. The near-eye display device of claim 14 wherein the inner layer is a central waveplate layer of the waveguide.

16. The near-eye display device of claim 11 wherein the near-eye support structure further comprises one or more housing structures for the projection light engine and the one or more housing structures arrange the image source and the projection optical system to fit within a twenty (20) mm height.

17. The near-eye display device of claim 11 wherein the image source comprises
  a reflective microdisplay which generates image light by reflecting light from one or more light sources;
  an illumination unit including the one or more light sources generating light; and
  an illumination directing element which polarizes and directs light from the illumination unit to a reflective surface of the reflective microdisplay and passes through image light reflected from the reflective microdisplay; and
  the illumination directing element is positioned within the high index glass region.

18. A method for coupling image light from an image source of a projection light engine to a near-eye display comprising:
  optically directing image light from the image source along a first optical path in a high index glass region within a projection optical system housing to a birdbath reflective optical element in the high index glass region;
  collimating and reflecting the image light by the birdbath reflective optical element along a second optical path extending through the high index glass region to an external exit pupil outside the projection optical system housing;
  polarizing the image light in at least one of the first optical path and the second optical path; and
  an input grating of a waveguide of the near-eye display optically coupling at least the image light of the exit pupil into the waveguide.

19. The method of claim 18 wherein polarizing the image light in at least one of the first optical path and the second optical path further comprises polarizing the image light in the second optical path by one or more polarizers including a quarter waveplate and a red rotation waveplate.

20. The method of claim 18 wherein optically directing image light from the image source along a first optical path in a high index glass region within a projection optical system housing to a birdbath reflective optical element in the high index glass region is performed by a beam splitter.

* * * * *